F. S. GARFORD.
AUTOMATIC RELEASE COUPLING.
APPLICATION FILED APR. 11, 1918.

1,277,058. Patented Aug. 27, 1918.

Inventor:
F. S. Garford,
by Egerton R. Case,
Atty.

UNITED STATES PATENT OFFICE.

FRANCIS SYDNEY GARFORD, OF LOUGHEED, CANADA.

AUTOMATIC RELEASE-COUPLING.

1,277,058.	Specification of Letters Patent.	Patented Aug. 27, 1918.

Application filed April 11, 1918. Serial No. 227,945.

*To all whom it may concern:*

Be it known that I, FRANCIS SYDNEY GARFORD, a subject of the King of Great Britain, of the town of Lougheed, Province of Alberta, Canada, have invented certain new and useful Improvements in Automatic Release-Couplings, of which the following is a specification.

My invention relates to improvements in automatic release-couplers, and one object of my invention is to construct a coupler which will be actuated by a predetermined load to automatically uncouple or release two bodies or elements coupled together thereby so as to prevent breakage of either or both of said bodies or elements, and another object of my invention is to construct my coupler so that it can be adjusted to release at different loads according to circumstances governing the use of the device.

The construction of my device will be hereinafter particularly set forth and what I claim as new will be pointed out in the claim forming part of this specification.

Figure 1:
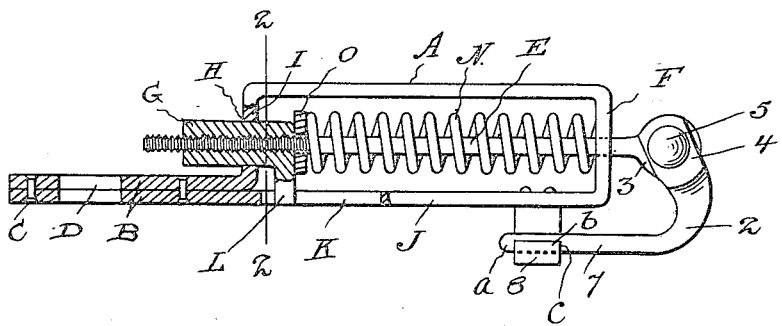
Figure 2:
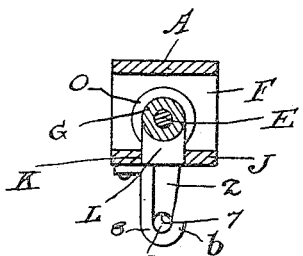
Figure 3:
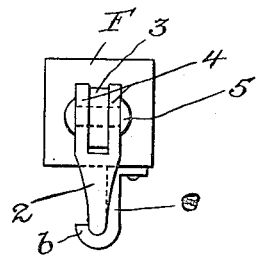

Figure 1 is a side elevation of my device with certain parts shown centrally longitudinally in section. Fig. 2 is a cross section on the line 2—2, Fig. 1, and Fig. 3 is an end elevation of the device.

In the drawings, like characters of reference refer to the same parts.

While my device may be used in various fields, I have primarily designed it to be used in coupling the source of moving power of an agricultural implement, therewith, especially a plow. When a plow, for example, strikes a rock firmly embedded in the ground, the horse or tractor will be uncoupled therefrom to prevent damage. Frequently valuable horses have been sprained during plowing from the cause mentioned, and it frequently happens that the plow point is broken. It is therefore also an object of my invention to prevent the breakage of a plow against fixed stones or rocks during plowing.

Through the use of my invention, there will be no sudden jar to oppose the propelling or moving means for the implement, and therefore it will be understood that particularly in the case of horses, there will be no danger of hurting them.

The coupler is constructed substantially as follows:

A is a suitable open frame beyond one end of which extend two plates B suitably secured together as by rivets C. The frame so constructed forms one of the coupling elements. The plates B are provided with any suitable eye or hole D for coupling purposes. E is the draw-bar mounted in the end plate F of the frame A. This drawbar is threaded through a nut G operating through an opening H formed in the end plate I of the frame A. The plate J of the frame A is provided with a longitudinal slot K through which extends a lip L. The nut G will be preferably round, and the lip L will co-act with the slot K to prevent the rotation of this nut. The construction just described is the preferred means for coupling the nut G to the frame A so as to allow for longitudinal movement thereof. N is a coiled-spring mounted on the draw-bar E within the frame A and interposed between this spring and the nut G is preferably a washer O of sufficient bore as to readily slide over the threaded portion of said draw-bar. A coupling hook 2 is pivoted to the head 3 of the draw-bar E in any suitable manner. The preferred manner of combining these parts is to provide this coupling hook with a bifurcated head 4 which straddles the head 3, and to pass through these parts a stout double-headed rivet 5. Normally, the arm 7 of the hook 2 rests in the open keeper 8 secured to or formed a part of the frame A. When under working conditions, the resistance met with is sufficient to compress the spring N the required amount, the arm 7 is withdrawn from the keeper, and so permits the coupling hook 2 to be operated to release.

It will be noticed from the drawings that the end $a$ of the arm 7 is well spaced apart from the plate J, and that the flange $b$ of the keeper 8 is quite low: this construction permits the arm 7 to be moved free of the flange $b$, and by turning the hook 2 and the draw bar E, the said hook may be uncoupled from said keeper without having to compress the spring. By reason of the construction just described, it will be understood that after the coupler has operated to release the body (not shown) coupled thereto by the hook 2, this hook can again be coupled to said body (not shown) and this arm 7 placed in the keeper 8 without having to move the draw-bar E to compress the spring. The shape of the hook 2 is such that the pressure exerted thereagainst under working conditions will keep the bar 7 in the keeper 8. The flange $b$, is high enough to prevent accidental lateral displacement of the said arm 7.

According to the distance the end $a$, of the arm 7 has to travel before it escapes the keeper 8, will depend the resistance offered by the spring N. Should the end $a$ be but a short distance within the edge $c$ of the keeper 8, it will be understood that the device will more quickly uncouple than is the case when the end $a$ of the arm 7 is in the position shown. The relative position of the end $a$ in respect of the edge $c$ of the keeper 8 is gotten by turning the draw-bar E in the nut G through the medium of the hook 2 after the same has been removed from the keeper 8.

The length of the nut G, of course must be such as to allow for the release of the arm 7 from the keeper 8, and yet not be withdrawn from the end plate I.

No tool has to be used to adjust or regulate the relative position of the various moving parts of my device.

Obviously various changes in details of construction can be made without departing from the scope of my claim.

Claim:

A device of the class described formed of an open rectangular frame having two alined hole-provided end-plates; a hole-provided coupling-plate extending longitudinally of the frame and in line with one side thereof; a draw-bar extending through each of the said end-plates with its longitudinal axis parallel to the line of draft, and having one of its ends threaded; an internally-threaded cylindrical nut mounted in one of said end-plates and through which the threaded portion of said draw-bar passes, to provide a sliding bushing for said bar; the said nut normally spaced apart from and overhanging said coupling-plate; a lip carried by one end of said nut and extending through the slot formed in one of the sides of said frame; a coiled-spring mounted on said draw-bar between said nut and one of said end-plates; a coupling-hook pivoted to one end of said draw-bar beyond said frame, and a keeper carried by said frame co-acting with said coupling hook to maintain it in normal position.

FRANCIS SYDNEY GARFORD.